United States Patent
Nakamura

(10) Patent No.: US 6,529,366 B2
(45) Date of Patent: Mar. 4, 2003

(54) SOLID ELECTROLYTIC CAPACITOR AND METHOD OF FABRICATING THE SAME

(75) Inventor: Takahiro Nakamura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/982,767

(22) Filed: Oct. 22, 2001

(65) Prior Publication Data

US 2002/0085335 A1 Jul. 4, 2002

Related U.S. Application Data

(62) Division of application No. 09/689,701, filed on Oct. 13, 2000.

(30) Foreign Application Priority Data

Oct. 14, 1999 (JP) ............................................. 10-292267

(51) Int. Cl.$^7$ ................................................. H01G 9/00
(52) U.S. Cl. ........................ 361/523; 361/528; 361/529; 361/512; 361/503; 29/25.03; 29/25.01
(58) Field of Search ................................ 361/523, 528, 361/509, 512, 524, 525, 508, 305, 311, 43, 272, 529, 530, 532, 511; 29/25.03, 25.41

(56) References Cited

U.S. PATENT DOCUMENTS

| | | | |
|---|---|---|---|
| 4,090,231 A | 5/1978 | Millard et al. ............... | 361/529 |
| 5,140,502 A | 8/1992 | Kudoh et al. ................ | 361/540 |
| 5,621,608 A | 4/1997 | Arai et al. ................... | 361/525 |
| 6,154,358 A | 11/2000 | Fukaumi et al. ............ | 361/523 |
| 6,210,450 B1 | 4/2001 | Fukaumi et al. ........... | 29/25.03 |
| 6,212,064 B1 * | 4/2001 | Aoki et al. | |
| 6,215,651 B1 | 4/2001 | Takada et al. .............. | 361/523 |
| 6,335,857 B1 | 1/2002 | Takimoto et al. | |
| 6,349,027 B1 | 2/2002 | Suhara et al. | |

* cited by examiner

Primary Examiner—N. T. Ha
(74) Attorney, Agent, or Firm—Arent Fox Kinter Plotkin & Kahn, PLLC

(57) ABSTRACT

A sintered body (10) made of valve action metal powders such as Ta powders, in which an anode lead (11) is embedded in one of wall faces is formed. A dielectric layer (oxide layer) (14) is formed around the metal powders. A manganese dioxide layer (15) is formed around the sintered body in which the dielectric layer is provided on the metal powders. A graphite layer is formed on the manganese dioxide layer. The graphite layer is made by an aqueous graphite layer (16) on the manganese dioxide layer side and a resin graphite layer (17) formed on the aqueous graphite layer. A metal layer (18) is formed on the graphite layer. In such a manner, a capacitor (1) element is formed. Preferably, the graphite layer is burned at a temperature ranging from 230 to 300° C. As a result, an increase in impedance caused by a thermal stress between cathode layers is prevented. Thus, a solid electrolytic capacitor having a small impedance between the anode and the cathode is obtained.

5 Claims, 3 Drawing Sheets

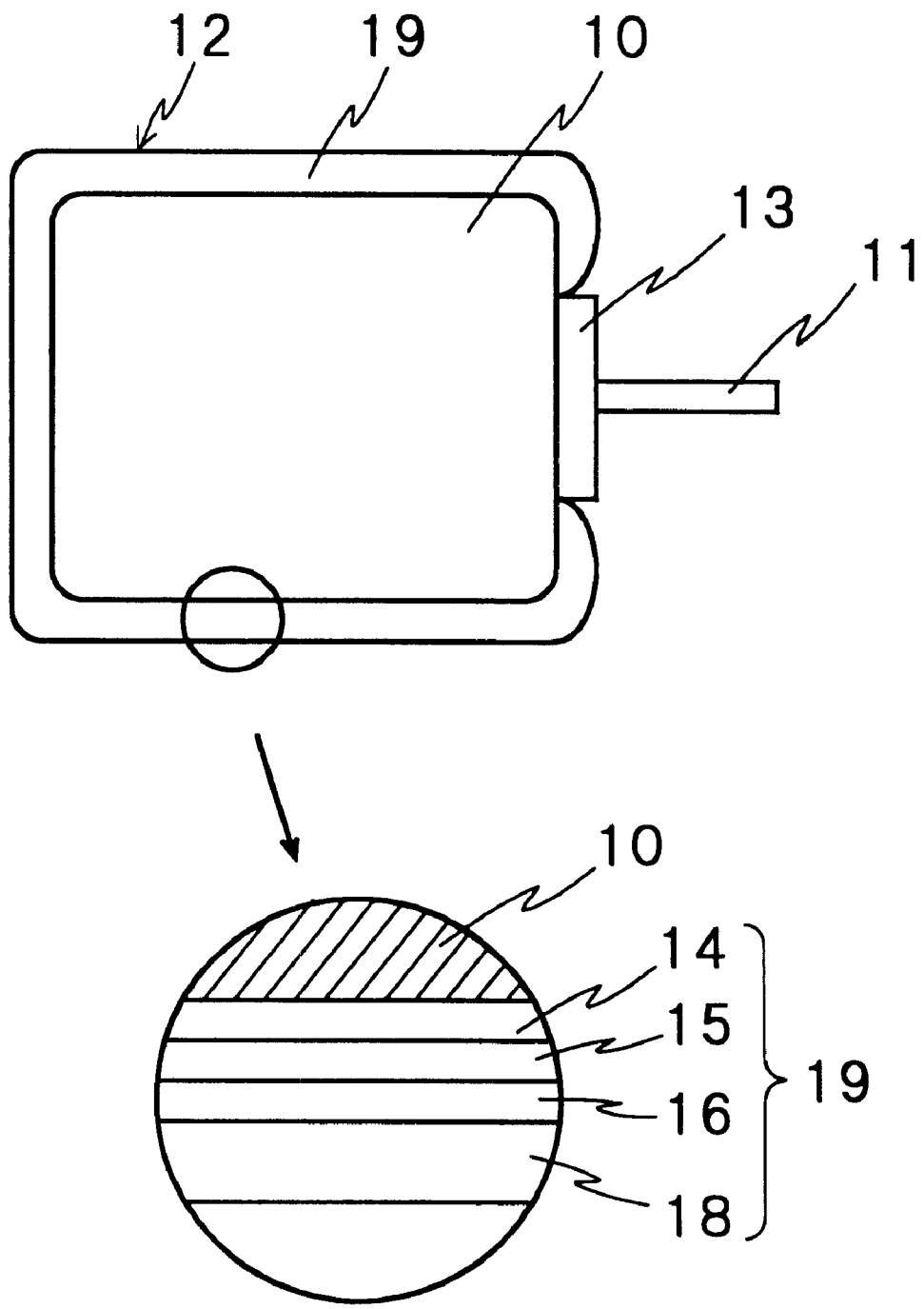

SOLID ELECTROLYTIC CAPACITOR AND METHOD OF FABRICATING THE SAME

This a Division of application Ser. No. 09/689,701 filed Oct. 13, 2000.

FIELD OF THE INVENTION

The present invention relates to a solid electrolytic capacitor made by a sintered body of valve action metal powders such as tantalum powders and a method of fabricating the same. More particularly, the invention relates to a solid electrolytic capacitor having a structure such that a cathode layer of a capacitor element is not peeled off, equivalent series resistance (impedance) is not increased, and short circuit or the like do not occur due to a temperature shock at the time of solder reflow when the capacitor is mounted on a circuit board or the like and to a method of fabricating the same.

BACKGROUND OF THE INVENTION

A capacitor element 1 to be built in a solid electrolytic capacitor such as a conventional tantalum electrolytic capacitor is fabricated as follows. As shown in FIG. 3, by using, for example, Ta powders, a molded body of a rectangular parallelepiped or a cube shape in which an anode lead 11 such as a Ta wire is embedded in one of the wall faces is obtained. The molded body is sintered in a vacuum atmosphere. Around the powders and the sintered body 10, a dielectric layer (oxide film) 14 made of $Ta_2O_5$ or the like and a manganese dioxide layer 15 are formed. Further, a graphite layer 16, and a silver resin layer 18 are sequentially formed, thereby obtaining an enveloping layer 19. The surface of the enveloping layer 19 is used as a cathode 12. The dielectric layer 14 is formed by anodizing (conversion treatment (coating)) the sintered body 10. The manganese dioxide layer 15 is formed by soaking the sintered body 10 in a manganese nitrate solution and thermal decomposing the manganese nitrate solution. The graphite layer 16 is formed by applying aqueous graphite (what is called India ink) and sintering it at about 130° C. The silver resin layer 18 is formed by applying what is called a silver paste and drying it at about 200° C. Reference numeral 13 denotes a Teflon ring.

As described above, the cathode 12 of the capacitor element 1 is formed by providing the enveloping layer 19 consisting of the above layers around the sintered body 10. The coefficients of linear expansion of the layers are different from each other as shown in Table 1.

TABLE 1

Coefficients of linear expansion of layers

| material | Coefficient of linear expansion |
|---|---|
| manganese dioxide layer | $0.6 \times 10^{-5}$ |
| graphite layer | $0.3 \times 10^{-5}$ |
| silver resin layer | $4.0 \times 10^{-5}$ |

As described above, in the cathode of the capacitor element, the various layers are provided on the surface of the sintered body on which the dielectric layer is formed and their coefficients of linear expansion are different from each other. Consequently, by a stress of a temperature shock of solder reflow at the time of mounting the solid electrolytic capacitor on a circuit board or the like, each of the layers is peeled or floated. As a result, the impedance (equivalent series resistance at a high frequency) increases and a problem such as deterioration in electric characteristics arises.

SUMMARY OF THE INVENTION

The invention has been achieved to solve such problems and an object of the invention is to provide a solid electrolytic capacitor having a small impedance between the anode and the cathode by preventing an increase in impedance (equivalent series resistance) based on a thermal stress which occurs between layers in the cathode layer, and a method of fabricating the solid electrolytic capacitor.

The inventor of the present invention has eagerly examined the cause of an increase in impedance between the anode and the cathode or an increase in leakage current after a solid electrolytic capacitor is mounted on a circuit board or the like. As a result, the inventor has found the cause as follows. At the time of mounting, the solid electrolytic capacitor is put in a reflow oven for soldering and the temperature is increased to about 270° C. By the temperature shock at the time of increasing the temperature, peeling or light floating occurs in each of the interfaces of the manganese dioxide layer, the graphite layer, and the metal layer (silver resin layer) as the cathode layers, the series resistance between layers therefore increases, and the impedance rises. It was found that a failure often occurs in especially the graphite layer which is a very thin layer, and the failure directly exerts a very large influence on the impedance between the anode and the cathode.

Further, the inventor examined the causes of the occurrence of peeling and floating between layers at the time of reflow for soldering and found main two causes which are: different coefficients of linear expansion of the layers; and a reversal of the relation between a stress on each layer in a state where the temperature is returned to a room temperature after sintering for forming the layers and a stress between layers at the time of soldering reflow. By interposing a resin graphite layer having an intermediate coefficient of linear expansion especially between the graphite layer and the metal layer (which is formed by drying a material such as a silver paste, obtained by mixing metal powders in a resin and which contains a small amount of a resin, so that it can be also called, for example, a silver resin layer) of different coefficients of linear expansion, and/or by sintering the graphite layer at a temperature of about 230 to 300° C., which is the temperature of the reflow for soldering, a burden on the graphite layer which is easily influenced by the stress is lightened. Consequently, an increase in impedance can be prevented.

According to the invention, there is provided a solid electrolytic capacitor having a capacitor element which comprises: a sintered body of valve action metal powders, in which an anode lead is embedded in one of wall faces; a dielectric layer provided on the metal powders; a manganese dioxide layer formed on the outer surface of the sintered body which is provided with the dielectric layer on the metal powders; a graphite layer formed on the manganese dioxide layer; and a metal layer formed on the graphite layer, wherein the graphite layer is made by an aqueous graphite layer provided on the manganese dioxide layer side and a resin graphite layer provided on the metal layer side.

The aqueous graphite denotes conventionally used graphite and is obtained by dispersing carbon powders in the water. It denotes what is called India ink. The resin graphite is obtained by dispersing carbon powders in a resin such as phenol resin and denotes what is called a paint.

In this structure, as the metal layer is formed by applying a paste obtained by mixing metal powders and a resin such as a silver paste and drying the paste, the metal layer therefore contains a small amount of resin. The resin graphite has a coefficient of linear expansion which is close to that of the metal layer. Between the aqueous graphite layer and the metal layer having coefficient of linear expansion which are particularly different from each other, the resin graphite layer having an intermediate coefficient of linear expansion is provided. As a result, the action of a stress based on the difference between the coefficients of linear expansion of the graphite layer and the metal layer is reduced. Even against a thermal shock which occurs during soldering at the time of mounting the capacitor, the layers of the cathode are not peeled or the like.

The aqueous graphite layer is formed by, for example, applying a solution obtained by dispersing carbon powders in water and burning the solution. The resin graphite layer is formed by, for example, applying a resin mixed with carbon powders and burning the resin.

Each of the aqueous graphite layer and the resin graphite layer is burned, preferably, at a temperature ranging from 230 to 300° C. In this case, the peeling between the graphite layer and neighboring layers does not easily occur even against a temperature cycle of the soldering reflow at the time of mounting the capacitor.

The metal layer is formed by applying a resin mixed with metal powders and drying the resin.

In the case of the structure such that each of the anode lead of the capacitor element and the metal layer is electrically connected to an end of an external lead, the whole capacitor element is molded in a package made of a resin, and the external lead is formed so that the other end of the external lead is soldered, the invention is especially preferable since the capacitor is rigid at the time of soldering.

The method of fabricating a solid electrolytic capacitor according to the invention, comprising the steps of: (a) forming a sintered body of valve action metal powders, (b) forming an oxide film on the surface of the metal powders by anodizing the sintered body, (c) forming a manganese dioxide layer around the metal powders and the sintered body, (d) forming a graphite layer on the manganese dioxide layer around the sintered body, and (e) forming a metal layer on the graphite layer, wherein the graphite layer is formed by applying a liquid graphite and burning the liquid graphite at 230 to 300° C.

By setting the temperature at which the graphite is burned to about the temperature at the time of soldering reflow, in a state where the temperature decreases to a room temperature after burning, the compressing force acts on the material having a small coefficient of linear expansion and the tensile force acts on the material having a large coefficient of linear expansion. At the time of soldering reflow, however, since the temperature is almost the same as that at the time of burning, no stress acts. That is, different from the conventional technique, the relation of stresses on layers at the room temperature and that at the time of reflow are not inverted. A damage is therefore reduced.

Preferably, the graphite layer is formed by applying an aqueous graphite, burning the aqueous graphite at 230 to 300° C., applying a resin graphite on the aqueous graphite, and burning the resin graphite at 230 to 300° C. By the method, floating which occurs in the cathode layers can be prevented more effectively.

BRIEF DESCRIPTION OF THE DRAWINGS

FIG. 3 is a view for describing the structure of a capacitor element in a conventional solid electrolytic capacitor.

DETAILED DESCRIPTION

Figure 1A:
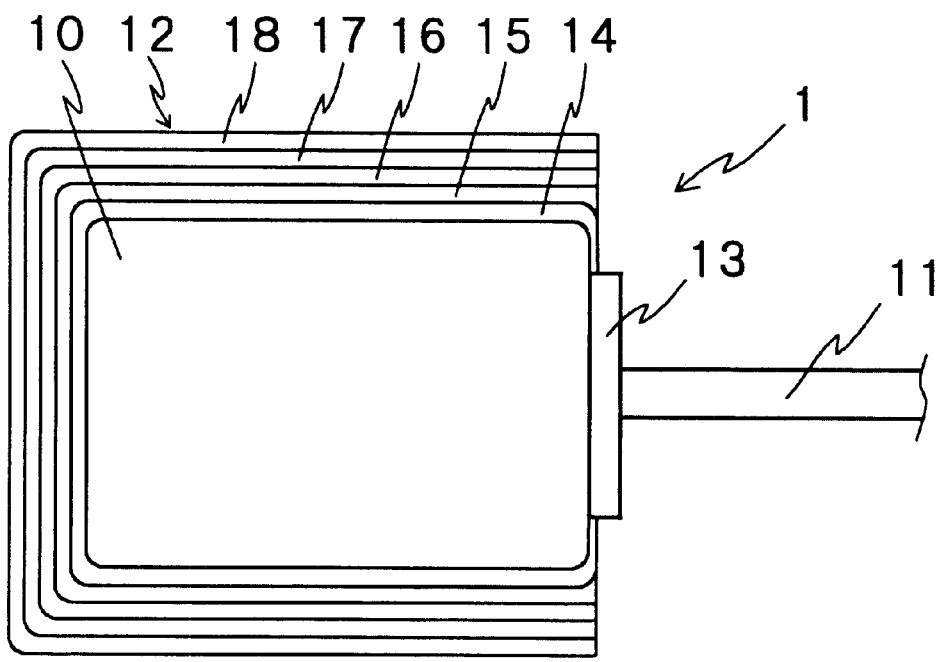
FIGS. 1(a) and 1(b) are cross sections of a solid electrolytic capacitor according to an embodiment of the invention.
Figure 1B:
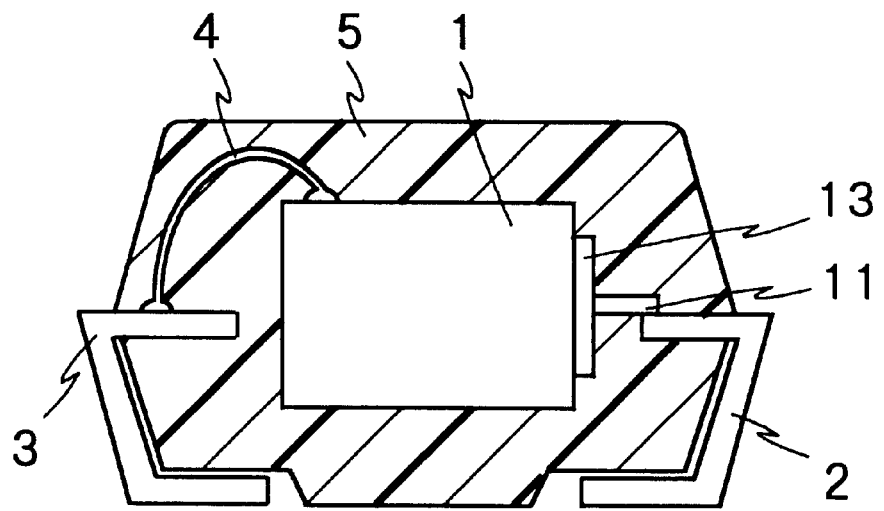

A solid electrolytic capacitor of the invention and a method of fabricating the same will be described with reference to the drawings. In a solid electrolytic capacitor of the invention, as shown in FIGS. 1(a) and 1(b) which are cross sections showing a capacitor element 1 as an embodiment of a solid electrolytic capacitor according to the invention and a state in which the capacitor element 1 is assembled in a package, a sintered body 10 of valve action metal powders such as Ta powders is formed. In one of the wall faces of the sintered body 10, an anode lead 11 is embedded. A dielectric layer (oxide film) 14 is provided around the metal powders and the sintered body 10, and a manganese dioxide layer 15 is provided around the powders and the sintered body 10 on which the dielectric layer 14 is formed. On the manganese dioxide layer 15, further, graphite layers 16 and 17 are provided. In the invention, the graphite layers are the aqueous graphite layer 16 provided on the manganese dioxide layer 15 side and the resin graphite layer 17 provided on the aqueous graphite layer 16. A metal layer 18 is provided on the resin graphite layer 17. In such a manner, the capacitor element 1 is formed.

The sintered body 10 is obtained by forming the valve action metal powders of tantalum, aluminum, niobium, or the like in a shape of a rectangle, cylindrical column or the like so that the anode lead 11 is embedded in one of the wall faces of the body and performing heat treatment on the body at about 1400 to 2300° C. for about 20 to 30 minutes in a vacuum atmosphere. The size of the sintered body 10 varies according to the kinds and characteristics of the solid electrolytic capacitors. For example, the sintered body 10 is formed in a cube or a rectangular parallelepiped having the bottom face of about 0.5 mm per side to about less than 1 mm per side. As the anode lead 11, for example, a tantalum wire having a thickness of about 0.2 mm$\phi$. A part of the anode lead 11 is embedded on the inside at the time of formation.

The dielectric layer (oxide film) 14 is formed by soaking the sintered body 10 in, for example, a phosphoric acid solution to make anodization occur. The surface of each of the Ta powders is therefore oxidized and becomes an oxide film of $Ta_2O_5$ or the like. The thickness of the oxide film is approximately 0.05 $\mu$m.

The manganese dioxide layer 15 is formed on the powders by soaking the sintered body on which the oxide film (dielectric layer 14) is formed into a manganese nitrate solution to be impregnated with the manganese nitrate solution and, after that, performing thermal decomposition. Further, the resultant sintered body is soaked in a manganese nitrate solution in which electrolyte $MnO_2$ particles are dispersed and thermal decomposition is performed, thereby forming the manganese dioxide layer 15 in thickness of about 20 to 30 $\mu$m around the sintered body.

As described above, the graphite layers are the aqueous graphite layer 16 and the resin graphite layer 17. Each of the graphite layers has a thickness of about 1 $\mu$m to a few $\mu$m. The aqueous graphite is obtained by dispersing carbon powders in water. The component of the aqueous graphite is the same as that of what is called India ink, and the aqueous graphite is conventionally used for a graphite layer. The sintered body 10 is soaked in the liquid graphite so that the liquid graphite is applied around the sintered body 10. The liquid aqueous graphite around the sintered body 10 is baked (burned) so as to evaporate water, thereby forming the aqueous graphite layer 16. The resin graphite is obtained by mixing carbon powders in a resin such as a phenol resin. The component of the resin graphite is the same as that of what is called a paint. The sintered body 10 on which the aqueous graphite layer 16 is formed is similarly soaked in a liquid resin graphite, so that the resin graphite is applied on the surface of the sintered body 10 and is baked, thereby forming the resin graphite layer 17.

When each of the applied aqueous graphite and resin graphite was baked at 130° C. which is the temperature of baking the conventional aqueous graphite, a result better than that of the conventional structure was obtained. As will be described hereinlater, when the baking was performed about 270° C. as a soldering reflow temperature, that is, about 230 to 300° C., the impedance characteristic was more excellent.

The metal layer 18 is made of a material obtained by mixing powders of silver, copper or the like in a resin such as phenol resin. What is called a silver paste or the like is used. The sintered body 10 is soaked in the paste so that the top face in which the anode lead 11 is embedded is not soaked, thereby applying the paste on the surface of the sintered body 10. After that, the paste is dried. In such a manner, the metal layer is formed to a thickness of about 50 $\mu$m. Since the metal layer 18 is formed by drying the paste containing the resin, the metal layer 18 contains a small amount of resin. The metal layer is therefore also called, for example, a silver resin. The surface is used as a cathode 12. With the surface 12 and the anode lead 11, the cathode and the anode of the solid electrolytic capacitor are constructed.

As shown in the cross section of FIG. 1(*b*), the anode lead 11 and the cathode 12 of the capacitor element 1 are connected to external leads 2 and 3 as a lead frame by resistance welding, via the fuse 4 and the like. The resultant is subjected to molding, and a resin package 5 is formed. The leads are cut from the lead frame. In such a manner, the solid electrolytic capacitor is formed.

In the structure, since the resin graphite layer 17 is provided between the aqueous graphite layer 16 as a graphite layer of the conventional structure and the metal layer (such as silver resin layer) 18, the stress between the graphite layer of the conventional structure and the silver resin layer can be lessened. Specifically, the coefficient of linear expansion of the aqueous graphite is $0.3 \times 10^{-5}$, that of the silver resin is $4 \times 10^{-5}$, and that of the resin graphite is $2 \times 10^{-5}$. By providing the resin graphite, the material having the intermediate coefficient of linear expansion is interposed. Consequently, the stress between the aqueous graphite layer 16 and the silver resin layer 18 can be lessened. On the other hand, the resin component of the resin graphite layer 17 is of the same system as that of the silver resin layer 18. Since the carbon powders in the resin graphite layer 17 are the same as those contained in the aqueous graphite, the resin graphite layer 17 is well adapted to both the aqueous graphite layer 16 and the silver resin layer 18. Even when a temperature shock occurs, the graphite layer or the silver resin layer is not therefore peeled off or floated.

The structure was burned (baked) at 130° C. similar to the conventional temperature of burning the graphite layer. The average x of impedances of thirty capacitors at 100 kHz after soldering reflow was 2.14Ω, and the standard deviation σ as an average of variations was 0.23. Consequently, impedance characteristics much better than those (x=5.63Ω and σ=1.29) of the conventional structure were obtained.

Figure 2:
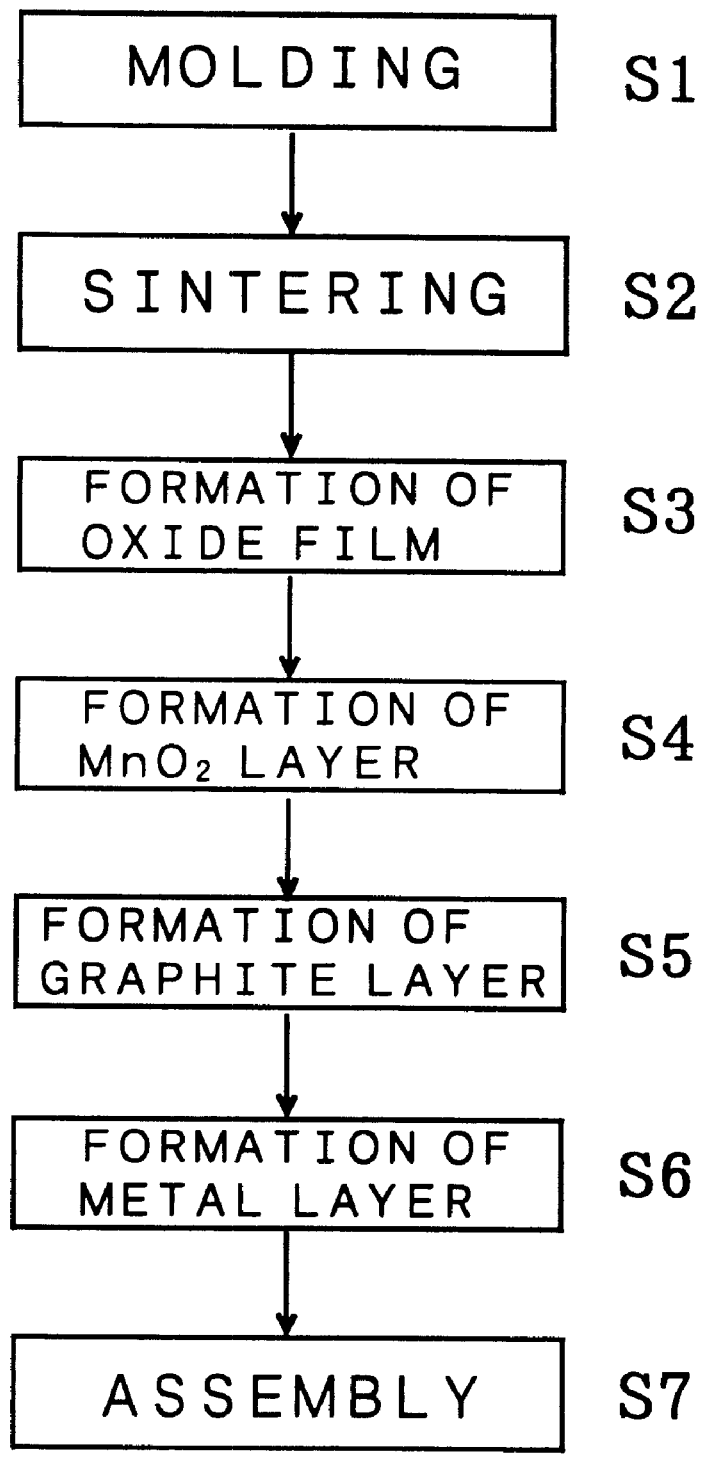
FIG. 2 is a flowchart of an embodiment of a method of fabricating a solid electrolytic capacitor according to the invention.

A method of fabricating a solid electrolytic capacitor obtained by using a conventional aqueous graphite layer as a graphite layer and sintering the aqueous graphite layer at about 270° C. which is about the same as that of the soldering reflow will be described with reference to the flowchart of FIG. 2.

(a) First, valve action metal powders such as tantalum powders are molded in a cube of about 0.5 mm per side and a tantalum wire having the diameter of, for example, about 0.2 mm$\phi$ is embedded on one of the side faces of the cube, thereby obtaining a molded body (S1). By sintering the molded body is sintered at 1400 to 2300° C. for about 20 to 30 minutes in a vacuum, the sintered body 10 in which the anode lead 11 is embedded in one of the wall faces is formed (S2).

(b) Subsequently, the base portion of the anode lead 11 is covered with a Teflon ring 13 and the tip of the anode lead 11 of the capacitor element is welded to, for example, a stainless steel bar. In such a manner, tens of devices are welded to the stainless steel bar. The devices welded to the stainless steel bar are soaked in, for example, a phosphoric acid solution and are subjected to anodization by using the anode lead 11 as an anode, thereby forming an oxide film (dielectric layer) made of $Ta_2O_5$ around the tantalum powders (conversion treatment (coating)) (S3).

(c) The sintered body is then soaked in a manganese nitrate solution so as to be impregnated with the manganese nitrate solution in a state where it is welded to the stainless steel bar. The water content is evaporated in an oven and the manganese nitrate solution is decomposed until no nitrogen dioxide gas is contained, thereby forming a manganese dioxide layer on the oxide film (S4). In this case, the manganese dioxide layer 15 is formed not only on the inside of the sintered body 10 but also on the oxide film 14 around the sintered body 10. Since the oxide film is partly damaged in the step of forming the manganese dioxide layer, the same step as the conversion coating process is performed again. The steps are repeated a plurality of times (re-conversion treatment).

(d) The aqueous graphite layer 16 is formed on the manganese dioxide layer 15 around the sintered body 10. The sintered body 10 on which the manganese dioxide layer 15 is formed is soaked in the graphite solution in a state where it is welded to the stainless steel bar, and the sintered body 10 is pulled up, thereby applying the graphite solution around the sintered body 10. The resultant is put in an oven of about 270° C. which is about the temperature of soldering reflow at time of mounting the capacitor, and is burned for about 60 minutes, thereby forming the aqueous graphite layer 16 having a thickness of about 1 to a few $\mu$m (S5). That is, the burning is conventionally performed at a temperature of about 130° C. By performing the burning at a temperature which is about that of the soldering reflow at the time of mounting the capacitor, the impedance can be reduced. The reasons will be described hereinlater.

(e) After that, the silver resin layer (metal layer) 18 is formed on the graphite layer 16 (S6). The silver resin layer 18 is formed by soaking the sintered body 10 on which the graphite layer 16 is formed in a silver paste so as to apply the silver paste around the sintered body 10 and drying the silver paste at the temperature around 200° C. The silver resin layer 18 is thus formed to a thickness of about 50 $\mu$m.

The anode lead 11 and the cathode 12 of the capacitor element 1 formed as described above are connected to the external leads 2 and 3 of the lead frame, the resin package 5 is formed by resin molding, the external leads 2 and 3 are cut from the lead frame, and forming is performed, thereby obtaining the solid electrolytic capacitor (S7).

The reason why the impedance is reduced when the sintering temperature is set to the temperature which is about that of soldering reflow at the time of mounting will now be described. When the burning is performed at the temperature at the time of soldering reflow, for example, 270° C., the manganese dioxide layer 15 and the graphite layer 16 are in contact with each other in a state where the stress does not act at the temperature of 270° C. When the burning operation is finished and the temperature is returned to a room temperature, the graphite layer 16 having a small coefficient of linear expansion is subjected to a compression force and the manganese dioxide layer 15 having a large coefficient of linear expansion is subjected to a tensile force. Even if the temperature rises to that at the time of soldering reflow, however, the stress becomes almost zero but the relation between the compression force and the tensile force on the layers is not reversed. When the soldering reflow is finished and the temperature is returned to the room temperature, the compression force acts on the graphite layer 16, the tensile force acts on the manganese dioxide layer 15, and the relation between the stresses is not reversed.

On the other hand, in the conventional fabricating method, the relation between the stresses remains the same at a room temperature. When the temperature exceeds 130° C. at the time of soldering reflow, however, the relation between the tensile force and the compression force is reversed, and the temperature rises to 270° C. It was found out by the wholehearted examination of the inventor of the present invention that the phenomenon such as peeling caused by the temperature shock is largely influenced by the reversal of the relation between the stresses and that, if the relation between the stresses is not reversed, peeling between layers and floating do not easily occur.

The impedance of the tantalum electrolytic capacitor manufactured by the method as an average of thirty samples was examined in a manner similar to the above. The average x of the impedance was 3.15Ω and the standard deviation σ was 0.46. Although it is inferior to the capacitor in which the resin graphite layer is inserted, the characteristics are clearly improved as compared with those of the conventional structure.

Further, thirty capacitors were fabricated each by burning the aqueous graphite layer 16 at a high temperature, similarly burning the resin graphite layer 17 at about 270° C., and forming the silver resin layer 18 on the resin graphite layer 17. The average impedance x and the standard deviation σ at 100 kHz were examined. Table 2 shows the results together with those of the solid electrolytic capacitor of the conventional structure, the capacitor having the structure shown in FIG. 1, and the capacitor manufactured by the method shown in FIG. 2 for comparison.

TABLE 2

| impedance according to structures or manufacturing methods | |
|---|---|
| | impedance (Ω) |
| (1) conventional structure | x = 5.63 σ = 1.29 |
| (2) insertion of resin graphite layer | x = 2.14 σ = 0.23 |
| (3) burning temperature of | |

TABLE 2-continued

| impedance according to structures or manufacturing methods | |
|---|---|
| | impedance (Ω) |
| graphite layer: 270° C. | x = 3.15 σ = 0.46 |
| (2) + (3) | x = 1.83 σ = 0.11 |

As obviously understood from Table 2, by using a plurality of graphite layers of the aqueous graphite layer 16 and the resin graphite layer 17 and, moreover, burning both the graphite layers at temperatures around the soldering reflow temperature at the time of mounting, the impedance at 100 kHz can be largely reduced.

According to the present invention, since the layer having the coefficient of linear expansion close to that of a metal layer is interposed between the graphite layers which exert the greatest influence on the impedance between electrodes, the structure in which the stress is lessened also against a thermal shock at the time of soldering reflow is obtained. Consequently, the cathode layer is not peeled off, floated or the like, and the impedance is not increased.

Further, by sintering the graphite layer at a temperature around the temperature of soldering reflow at the time of mounting the capacitor, the relation between the stresses on the graphite layer at a room temperature and that at the time of soldering reflow are not reversed. The peeling, floating or the like does is not caused in the graphite layer by a thermal shock. Impedance characteristics can be therefore excellently maintained.

Although preferred example have been described in some detail it is to be understood that certain changes can be made by those skilled in the art without departing from the spirit and scope of the invention as defined by the appended claims.

What is claimed is:

1. A method of fabricating a solid electrolytic capacitor, comprising the steps of:
   (a) forming a sintered body of valve action metal powders;
   (b) forming an oxide film on the surface of said metal powders by anodizing said sintered body;
   (c) forming a manganese dioxide layer around said metal powders and said sintered body;
   (d) forming a graphite layer on said manganese dioxide layer around said sintered body; and
   (e) forming a metal layer on said graphite layer,
   wherein said graphite layer in contact with said metal layer is formed by applying a liquid graphite and burning said liquid graphite at 230 to 300° C.

2. The method of claim 1, wherein said graphite layer is formed by applying an aqueous graphite, burning said aqueous graphite at 230 to 300° C., applying a resin graphite on said aqueous graphite, and burning said resin graphite at 230 to 300° C.

3. The method of claim 2, wherein a solution obtained by dispersing carbon powders in water is applied as said aqueous graphite.

4. The method of claim 2, wherein a resin with which carbon powders are mixed is applied as said resin graphite.

5. The method of claim 1, wherein said metal layer is formed by applying a resin with which metal powders are mixed, and drying said resin.

\* \* \* \* \*